July 31, 1945.  J. B. GRAHAM  2,380,690
PIPE JOINT
Filed Sept. 13, 1943
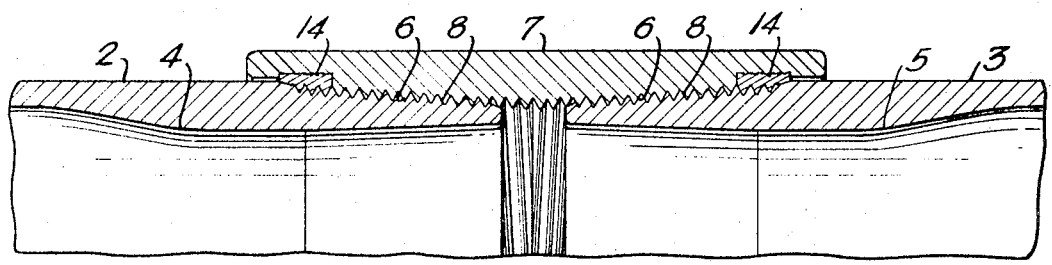
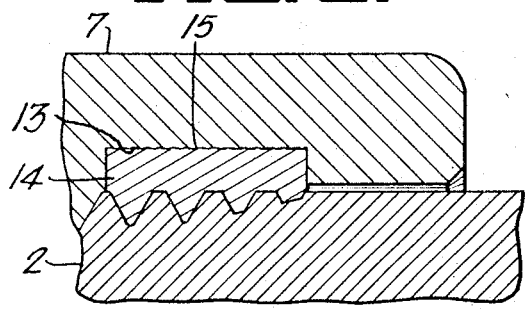
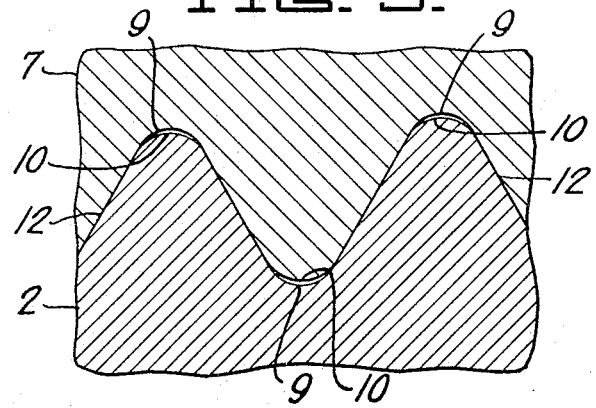
INVENTOR:
JAMES B. GRAHAM,
BY John E. Jackson
ATTORNEY.

Patented July 31, 1945

2,380,690

UNITED STATES PATENT OFFICE 2,380,690

PIPE JOINT

James B. Graham, Mount Lebanon, Pa., assignor to National Tube Company, a corporation of New Jersey Application September 13, 1943, Serial No. 502,189

3 Claims. (Cl. 285—146)

This invention relates to pipe joints and, particularly to an improved threaded joint for drill pipe and the like.

In the assembling of drill pipe in oil wells and the like, it is customary to use a conventional type of box and pin tool joint for connecting together the lengths of pipe. In such a joint, each end of the lengths of pipe is provided usually with a square shoulder adjacent the end of the thread to prevent creeping of the members relative to each other when the drill string is roated while in use. Such a construction requires extreme accuracy in order to provide a satisfactory fit both on the threads and the square shoulders so as to provide a good joint. Even though this accuracy may be achieved in the box and pin as manufactured, the square shoulder prevents any further "make-up" compensating for wear on the threads resulting from assembling and disassembling the lengths of pipe with the result that the wear is concentrated at one place on the threads at the joint. Also any damage to the face of the square shoulder, even though very slight, prevents proper assemblage of the joint. This causes rocking within the joint during rotary drilling operations, resulting in fatigue breaks in the pin member.

Another disadvantage of the conventional type of tool joint is that when it is drawn up tightly with conventional threads connecting the box and pin members to the pipe ends it is impossible to unscrew the box and pin members from the pipe ends. Thus when it is desired to remove these members from the ends of the lengths of pipe, it is necessary to split the joints with an oxy-acetylene or similar torch in order to save the lengths of pipe for reuse or to burn off the pipe and then split the pipe with a torch from the interior of the joint members. Such procedure is not only inconvenient and laborious but expensive as well.

Accordingly, it is an object of the present invention to provide an improved threaded drill pipe joint which obviates the necessity of a box and pin type tool joint as heretofore used so as to eliminate the above mentioned disadvantages.

It is another object of the invention to provide an improved drill pipe joint of the threaded and coupled type which will not seize or gall when drawn up tight so that the joint can be unscrewed easily and quickly without damage to the threads of either the pipe or the coupling.

It is a further object of this invention to provide an improved joint for drill pipes and the like wherein the stresses concentrated on the threads of the pipes adjacent the end of the coupling are distributed over a relatively large area so as to eliminate fatigue failure of the pipe at this point.

It is still another object of the present invention to provide an improved threaded joint for drill pipes and the like wherein the threaded portions on both the pipes and the coupling have the proper taper, form and pitch so as to permit rapid assembling and disassembling and at the same time provide a joint wherein any creeping characteristics of the pipes relative to the coupling is eliminated when the joint is tightened.

Various other objects and advantages of this invention will be more apparent in the course of the following specification and will be particularly pointed out in the appended claims.

In the accompanying drawing there is shown, for the purpose of illustration, an embodiment which my invention may assume in practice.

In this drawing:

Figure 1 is a longitudinal fragmentary sectional view through the improved joint of my invention;

Figure 2 is an enlarged sectional view of one end of the coupling showing the insert member in position therein; and Figure 3 is an enlarged sectional view showing the construction of the threads on both the pipe and the coupling.

Referring more particularly to the drawing, there is shown for the purpose of illustration the joint between the adjacent ends of two lengths of adjacent drill pipes 2 and 3 of a drill string. Each end of each of the lengths of drill pipes preferably is upset as at 4 and 5, and are exteriorly threaded as at 6. Around the ends of the threaded portions 6 of the lengths of pipes 2 and 3, there is arranged a coupling 7 which is interiorly threaded as at 8. Both the threaded portion 6 on the ends of the lengths of pipes and the threaded portion 8 on the interior of the coupling, are tapered somewhat more than the conventional threaded and coupled joint threads. This taper is preferably approximately from 1¼ inches per linear foot to 1¾ inches per linear foot, and it has been found that the taper most satisfactory for use should be preferably 1½ inches per linear foot. Also the pitch of the threads of the threaded portions 6 and 8 should be from four to six threads per inch and it has been found that five threads per inch is most satisfactory.

The particular thread form used, as more clearly shown in Figure 3 of the drawing, is preferably of the conventional V-type having a contained angle of 60 degrees. Both the roots 9 of each of the threads, i. e., the bottom of the threads, and the crests 10 of each of the threads are rounded with the radius of arcuation of each of the roots being slightly larger than that of the crests so as to provide a slight clearance therebetween, as shown in Figure 3. It has been found that the radius of arcuation of the roots should be about .003 of an inch larger than that of the crests so as to provide a clearance of approximately .003 of an inch between the crests and the roots of the opposed threads when the joint is assembled and tightened. By providing such clearance between the crests and the roots of the threads, both the flank or side portions 12 of each of the threads will bear directly against the side or flank portions of the opposed threads. It will be understood that such a result cannot be obtained if there is not provided sufficient clearance between the crests and roots of the threads. It will be understood that the clearance between the roots and the crests of the threads is merely sufficient to permit bearing contact of both flank portions of one thread with opposed flanks of an opposed thread and is at the same time small enough to make the threads leakproof. By providing such a construction, due to the angle of taper of the threaded portions 6 and 8 and the full bearing of both flank portions of each of the threads with the flanks of opposed threads, sufficient resistance is provided to prevent creeping of the pipes 2 and 3 relative to the coupling 7 when the drill pipe is rotated while in use.

There is arranged in the coupling 7 adjacent each end thereof, a recess 13 in which there is positioned a relatively wide annular member 14 which is made preferably of copper, brass or from other suitable non-ferrous material softer than the steel forming the lengths of pipes 2 and 3 and coupling 7. Each of the annular members 14 is preferably expanded into tight engagement with the periphery of the respective recesses 13. The periphery of each of the recesses 13 is preferably knurled as at 15 or has depressions or grooves formed therein so that the annular members 14 will be held securely therein and prevented from turning when the joint is assembled or disassembled. Each of the annular members 14 may be interiorly threaded before they are assembled in the coupling, but if desired, the threads 6 on the ends of the sections 2 and 3 may be made to cut and form threads in the annular members when the joint is assembled. It is the primary purpose of each of the annular members 14 to prevent the corrosion water encountered in drilling from contacting the innermost threads of the threaded portions 6 on the ends of the pipes 2 and 3. These corrosion waters, due to their action on the otherwise exposed threads of the pipes tend to cause corrosion fatigue, and breaking off of the joint at the root of the first full thread usually occurs. The annular members 14 also function to lend support to the joint in resisting bending when the drill stem is revolved in drilling and thereby prevents fatigue and consequent failures. Another important aspect of the annular members 14 is that the stresses which usually are concentrated adjacent the ends of the coupling 7 around the pipes 2 and 3 at a point adjacent the root of the innermost threads of the pipes are distributed over a relatively wide area due to the fact that the annular members are relatively wide and tend to absorb such stresses and to distribute them therealong. In other words, the annular members 14 tend to act as cushions so as to absorb any stresses imparted at the ends of the coupling 7.

As a result of my invention, it will be seen that there is provided an improved joint for drill pipe which consists of a minimum number of parts and a joint which can be easily and quickly assembled and dismantled. It will be seen that the threaded portions of the improved joint of my invention are so constructed and arranged that leakage therethrough is eliminated and at the same time, any creeping characteristics of the lengths 2 and 3 relative to the coupling 7 are also eliminated. In other words, when the drill pipe is rotated, the lengths 2 and 3 will not be screwed any further into the coupling 7 due to the fact that the flank portions 12 lie directly against each other and prevent any further screwing action of the pipes into the coupling. By providing such a construction, it will be seen that the lengths of pipe can be easily unscrewed from the coupling when it is desired to dismantle the joint and the drill pipe. It will be seen that the annular members 14 also act to seal the joint due to the fact that they are made of a relatively soft metal and tend to flow into the innermost threads of the pipes when the joint is drawn up.

While I have shown and described one specific embodiment of my invention, it will be understood that this embodiment is merely for the purpose of illustration and description and that various other forms may be devised within the scope of my invention, as defined in the appended claims.

I claim:

1. A joint for drill pipe and the like comprising an exteriorly threaded portion arranged on the adjacent ends of the lengths of pipe adapted to be connected, an interiorly threaded coupling connecting the adjacent ends of said pipes, the exteriorly threaded portion on the end of said pipes and the interiorly threaded portion of said coupling having a taper approximately of from 1¼ inches to 1¾ inches per linear foot and having from four to six threads per inch, both the exterior threads on the pipes and the interior threads of said coupling having rounded crests and roots with the radius of the roots being slightly larger than that of the crests so as to provide a slight clearance between the crests and the respective opposed roots said clearance being sufficient to permit both flanks of each thread to bear against the flanks of the opposing threads over substantially their entire surface and insufficient to cause leakage through the joint, said taper and said bearing combining to prevent creeping of the lengths of pipe relative to the coupling when the drill pipe is rotated in use.

2. A joint for drill pipe and the like comprising an exteriorly threaded portion arranged on the adjacent ends of the lengths of pipe adapted to be connected, an interiorly threaded coupling connecting the adjacent ends of said pipes, the exteriorly threaded portion on the end of each of said pipes and the interiorly threaded portion of the coupling having a taper approximately of 1½ inches per linear foot and having five threads per inch, both the exterior threads on the ends of said pipes and the interior threads of the coupling having rounded crests and roots with the radius of the roots being slightly larger than that of the crests so as to provide a clearance of about .003 of an inch between the crest of one thread and the root of an opposed thread said clearance being sufficient to permit both flanks of each thread to bear against the flanks of the opposing threads over substantially their entire surface and insufficient to cause leakage through the joint, said taper and said bearing combining to prevent creeping of the lengths of pipe relative to the coupling when the drill pipe is rotated in use.

3. A joint for drill pipe and the like comprising an exteriorly threaded portion arranged on the adjacent ends of the lengths of pipe adapted to be connected, an interiorly threaded coupling connecting the adjacent ends of said pipes, the exteriorly threaded portion on the end of said pipes and the interiorly threaded portion of said coupling having a taper approximately of from 1¼ inches to 1¾ inches per linear foot and having from four to six threads per inch, both the exterior threads on the pipes and the interior threads of said coupling having rounded crests and roots with the radius of the roots being slightly larger than that of the crests so as to provide a clearance of about .003 of an inch between the crests and the respective opposed roots, said clearance being sufficient to permit both flanks of each thread to bear against the flanks of the opposing threads over substantially their entire surface and insufficient to cause leakage through the joint, said taper and said bearing combining to prevent creeping of the lengths of pipe relative to the coupling when the drill pipe is rotated in use.

JAMES B. GRAHAM.